US006668084B1

(12) United States Patent
Minami

(10) Patent No.: US 6,668,084 B1
(45) Date of Patent: Dec. 23, 2003

(54) IMAGE RECOGNITION METHOD

(75) Inventor: Mamoru Minami, Fukui (JP)

(73) Assignee: CCS Inc., Kyoto (JP)

( * ) Notice: Subject to any disclaimer, the term of this patent is extended or adjusted under 35 U.S.C. 154(b) by 0 days.

(21) Appl. No.: 09/536,710

(22) Filed: Mar. 28, 2000

(30) Foreign Application Priority Data

Sep. 24, 1999 (JP) .......................................... 11-270092

(51) Int. Cl.[7] .............................................. G06K 9/62
(52) U.S. Cl. ...................... 382/215; 382/103; 382/216
(58) Field of Search ............................... 382/103, 151, 382/159, 160, 170, 181, 203, 209, 217, 218, 219, 226, 278, 291, 293, 215, 216; 340/933, 937; 348/169

(56) References Cited

U.S. PATENT DOCUMENTS

| | | | | |
|---|---|---|---|---|
| 5,757,287 A | * | 5/1998 | Kitamura et al. | 340/937 |
| 5,828,769 A | * | 10/1998 | Burns | 382/118 |
| 5,920,658 A | * | 7/1999 | Yamagata et al. | 382/293 |
| 6,005,978 A | * | 12/1999 | Garakani | 382/218 |
| 6,023,530 A | * | 2/2000 | Wilson | 382/219 |
| 6,324,299 B1 | * | 11/2001 | Sarachik et al. | 382/151 |
| 6,385,340 B1 | * | 5/2002 | Wilson | 382/218 |
| 6,477,272 B1 | * | 11/2002 | Krumm et al. | 382/170 |

OTHER PUBLICATIONS

Rosin "sample complexity of model–based search", ACM, pp. 259–267, 1998.*
Delibasis et al "genetic algorithms and deformable geometric models for anatomical object recognition", IEEE, pp. 1–8, 1994.*
Tsang, et al "a genetic algorithm for projective invariant object recognition", IEEE, pp. 58–63, 1996.*
Ravichandra, et al "model–based matching using a hybrid genetic algorithm", IEEE, pp. 2064–2069, 1994.*

* cited by examiner

Primary Examiner—Daniel G. Mariam
(74) Attorney, Agent, or Firm—Armstrong, Kratz, Quintos, Hanson & Brooks, LLP

(57) ABSTRACT

The present invention provides an image recognition method whereby the influence of noise due to fluctuations of the ambient environment can be minimized and which has good response and high recognition accuracy, without using binary processing. In the image recognition of the present invention, search models where the shape and luminance value distribution of an object are modeled, are stored as image data in advance, and when multi-grayscale image data including the object is input (Step 1), the plurality of search models are distributed in the image sensing area of this input image data (Step 2), the goodness-of-fit for indicating correlation with the object is calculated for each one of the search models (Step 3), the search models are rearranged based on the goodness-of-fit (Step 5), selected (Step 6), crossed and regenerated (Step 7), and mutated and regenerated (Step 8), and through executing this genetic control, the optimum solution of the position and orientation information of the object is searched.

5 Claims, 23 Drawing Sheets

Fig. 4

| 12a | 2 | 2 | 2 | 2 | ← 12 |
| --- | --- | --- | --- | --- | --- |
| 12b | 2 | 3 | 3 | 2 | |
| 12c | 2 | 3 | 3 | 2 | |
| | 2 | 3 | 3 | 2 | |
| | 2 | 4 | 4 | 2 | |
| | 2 | 4 | 4 | 2 | |
| | 2 | 2 | 2 | 2 | |

Figure 5:
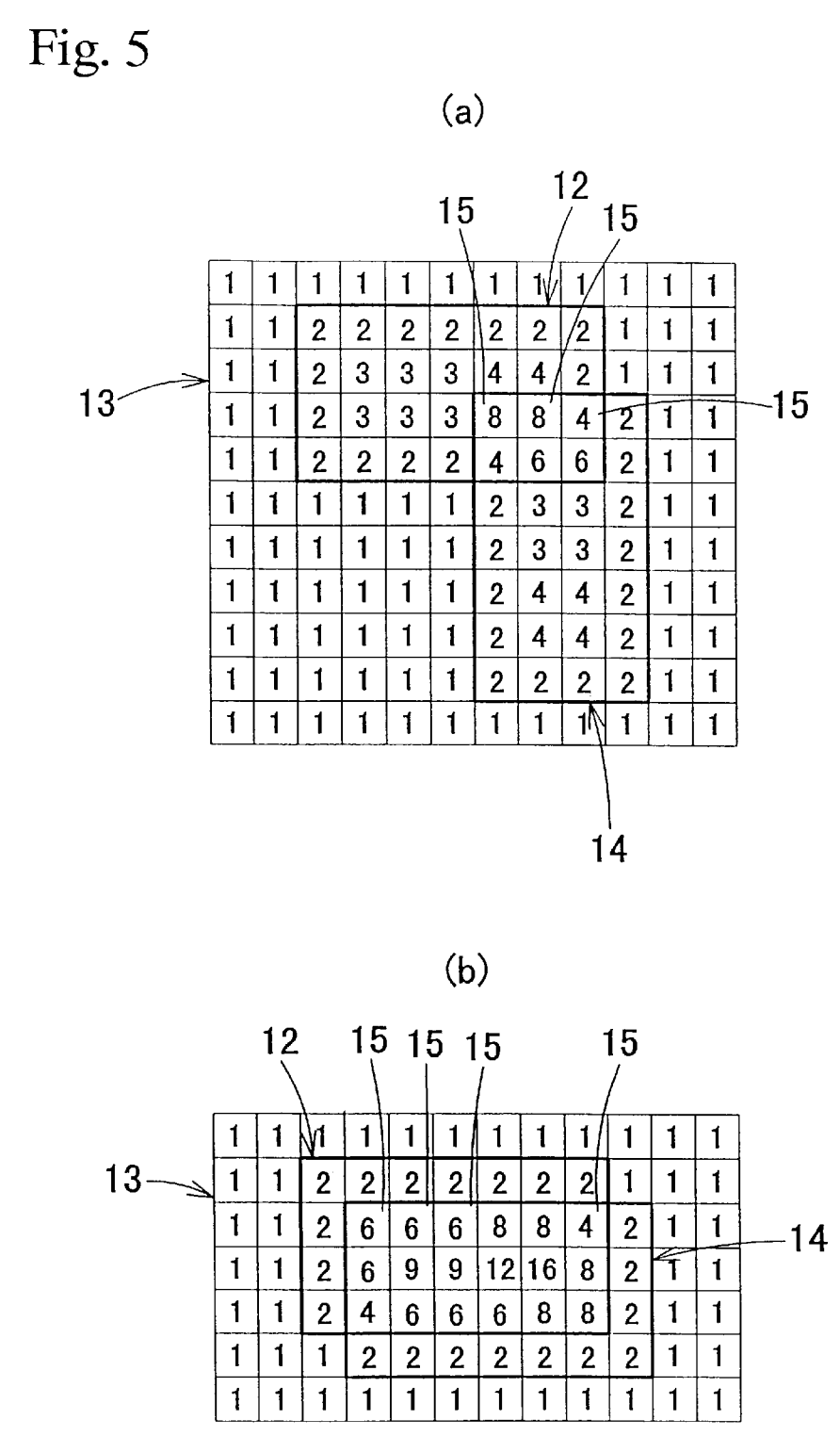

|   |   |   |   |   |   |   |   |   |   |   |
|---|---|---|---|---|---|---|---|---|---|---|
| 1 | 1 | 1 | 1 | 1 | 1 | 1 | 1 | 1 | 1 | 1 |
| 1 | 1 | 2 | 2 | 2 | 2 | 2 | 2 | 2 | 1 | 1 | 1 |
| 1 | 1 | 2 | 3 | 3 | 3 | 4 | 4 | 2 | 1 | 1 |
| 1 | 1 | 2 | 3 | 3 | 3 | 8 | 8 | 4 | 2 | 1 | 1 |
| 1 | 1 | 2 | 2 | 2 | 2 | 4 | 6 | 6 | 2 | 1 | 1 |
| 1 | 1 | 1 | 1 | 1 | 1 | 2 | 3 | 3 | 2 | 1 | 1 |
| 1 | 1 | 1 | 1 | 1 | 1 | 2 | 3 | 3 | 2 | 1 | 1 |
| 1 | 1 | 1 | 1 | 1 | 1 | 2 | 4 | 4 | 2 | 1 | 1 |
| 1 | 1 | 1 | 1 | 1 | 1 | 2 | 4 | 4 | 2 | 1 | 1 |
| 1 | 1 | 1 | 1 | 1 | 1 | 2 | 2 | 2 | 2 | 1 | 1 |
| 1 | 1 | 1 | 1 | 1 | 1 | 1 | 1 | 1 | 1 | 1 |

(b)

|   |   |   |   |   |   |   |   |   |   |   |
|---|---|---|---|---|---|---|---|---|---|---|
| 1 | 1 | 1 | 1 | 1 | 1 | 1 | 1 | 1 | 1 | 1 |
| 1 | 1 | 2 | 2 | 2 | 2 | 2 | 2 | 2 | 1 | 1 | 1 |
| 1 | 1 | 2 | 6 | 6 | 6 | 8 | 8 | 4 | 2 | 1 | 1 |
| 1 | 1 | 2 | 6 | 9 | 9 | 12 | 16 | 8 | 2 | 1 | 1 |
| 1 | 1 | 2 | 4 | 6 | 6 | 6 | 8 | 8 | 2 | 1 | 1 |
| 1 | 1 | 1 | 2 | 2 | 2 | 2 | 2 | 2 | 2 | 1 | 1 |
| 1 | 1 | 1 | 1 | 1 | 1 | 1 | 1 | 1 | 1 | 1 |

Fig. 15

POSITION: X   POSITION: Y   ORIENTATION: θ

001110001100011001 10110

POSITION AND ORIENTATION INFORMATION OF SEARCH MODEL

IMAGE RECOGNITION METHOD

BACKGROUND OF THE INVENTION

1. Field of the Invention

The present invention relates to an image recognition method which identifies an object by searching the position and orientation of the object included in the image data.

2. Description of the Related Art

Various image recognition methods for identifying a specific object from image data have been known, but a general method is storing multi-grayscale image data obtained by shooting with a CCD camera (hereafter raw image data) in a memory and using binary images of this raw image data for identifying an object from background images other than the object. In the case of CCD where 1 pixel has 256 grayscales of resolution, for example image light to be input to CCD is sampled as 256 grayscale digital signals, then this sample is compared with a threshold value, and is converted into one of two types of digital signals (e.g. "0" or "1").

The image recognition method using binary images, however, has the following drawbacks.

When a raw image includes a shadow of an object and mirror reflection light, the shadow of the object and the mirror reflection light are amplified to be noise during binarizing processing depending on the setting of the threshold value, which may cause object recognition error. For example, when a square object placed on a workbench is shot by a CCD camera (128×128 pixels) as shown in FIG. 23, the raw image has a luminance value distribution shown in the three-dimensional graph in FIG. 24. In the case of the raw image shown in FIG. 24, the difference in the luminance value distribution in the object, a wall disposed at the lower right of the object and the workbench is clearly shown. If the raw image shown in FIG. 23 is binarized, however, the binary image becomes like the one in FIG. 25, where the luminance value of the wall is amplified to the same level as the object, becoming noise, and it is difficult to identify the wall and the object.

Image recognition methods used for removing the noises are, a method of performing fine line processing on a binary image, or a method of recognizing the end points, branching points and length of a skeletal line, and crossing points and angle between skeletal lines, after performing fine line processing on a binary image so that geometric features of the object are extracted in order to identify the object. The problem of these types of methods is that the processing time is lengthy. In order to decrease the influence of the above mentioned noises, it is also possible to set two types of level values in advance, and to binarize only the image signals between these level values, however this method is inappropriate for image processing which requires real-time processing, since it is difficult to select the level values and processing time is long. In the case of a visual servomechanism using a feedback loop, for example, if the above mentioned processing methods are used, it takes too much time for the recognition processing of an object, and when the recognition processing of a moving object at a certain position is completed, the moving object has already moved to a distance position, which makes it difficult to trace the moving object.

Also, in the case of the above mentioned processing methods, the threshold level which was set becomes appropriate while the lighting conditions on the mobile object and background image change as the object moves, so a recognition error of the object occurs. In such a case, an optimum threshold value must be calculated again along with the conditional changes, but deciding on an optimum threshold value is difficult, and the processing time tends to be long.

Also, when a CCD image sensing device is used, the characteristics of the CCD change according to the ambient temperature environment, that is, the luminance value of the output image changes due to the change of the stored charge amount according to the light receiving amount of CDD, so a threshold value once set may become inappropriate. In such a case, the threshold value must be calculated again, and just like the above case, deciding on an optimum threshold value is difficult, and the processing time tends to be long.

SUMMARY OF THE INVENTION

With the foregoing in view, it is an object of the present invention to provide an image recognition method with a high real-time characteristic where (1) the position and orientation information of an object is accurately determined, regardless the noise and change of luminance value of the object caused by changes of the ambient environment, such as illumination conditions, without executing binary processing, and (2) the object can be accurately recognized at very high-speed.

To achieve the above object, the inventors energetically researched focusing on a genetic algorithm method (hereafter "GA method") while performing research on an image processing method using raw image data without involving binary processing, and reached the present invention.

The image recognition method in accordance with the present invention comprises the steps of storing search models, where all or a part of shape and luminance value distribution of an object are modeled as image data in advance, obtaining input image data including the object, distributing the search models in the area of the input image data, and assigning the position and orientation information to each one of the search models as individual information, determining a function value to indicate correlation with the object for each one of the search models, and searching the solution of at least the position information of the object from the above input image data by evolving the search models using a genetic algorithm based on the above function values.

In other words, search models which overlap with the objects are generated by preparing the search models in advance and distributing the plurality of search models in the area of the above input image data. Here, a function value to evaluate the correlation between the object included in the above input image data and the search model (in the genetic algorithm, this function value is called the "goodness-of-fit". This phrase is used hereafter) is determined, the degree to which the search model overlaps with the object is evaluated, the search models are evolved using the GA method based on this goodness-of-fit, and a solution on the position information and orientation information of the selected search models are regarded as the position information and orientation information of this object, in order to recognize this object. Since image processing is possible using multi-grayscale input image data itself, the amplification of noise caused by deviation of the threshold value from the optimum value, along with the change of the luminance value during binary processing, which occurs in the case of the conventional method, does not occur, and image processing can be executed smoothly, which makes it possible to accurately recognize the position information and orientation information of the object.

When a plurality of search models are distributed in the area of the above input image data, it is preferable to distribute the search models randomly by generating the position information and orientation information of each search model. By this method, all input image data can be efficiently searched.

For the above function value, the sum of values determined from the luminance value of the above input image data in the internal area of the search model can be used. By this method, the function value can be determined using simple and quick calculation.

It is also preferable to assign constraints for the evolution of the position and orientation information of the above search models, in order to limit the search range of the object included in the above input image data. By this method, a local search can be very efficiently executed, so that the recognition processing time for the object can be decreased considerably.

It is also preferable to regard a search model having the highest function value at a desired control timing as the optimum solution without waiting for the conversion of evolution, since the object can be recognized at ultra-high-speed and the moving object can be traced.

BRIEF DESCRIPTION OF THE DRAWINGS

FIG. 4 is a diagram depicting an example of a square object and its luminance value distribution;

FIG. 5 is a diagram depicting a state where an object in the input image data and a search model overlap;

FIG. 15 is a schematic diagram depicting a binary data array of position and orientation information of a search model;

EXPLANATION OF REFERENCE NUMERALS AND SIGNS IN THIS DRAWINGS

Figure 1:
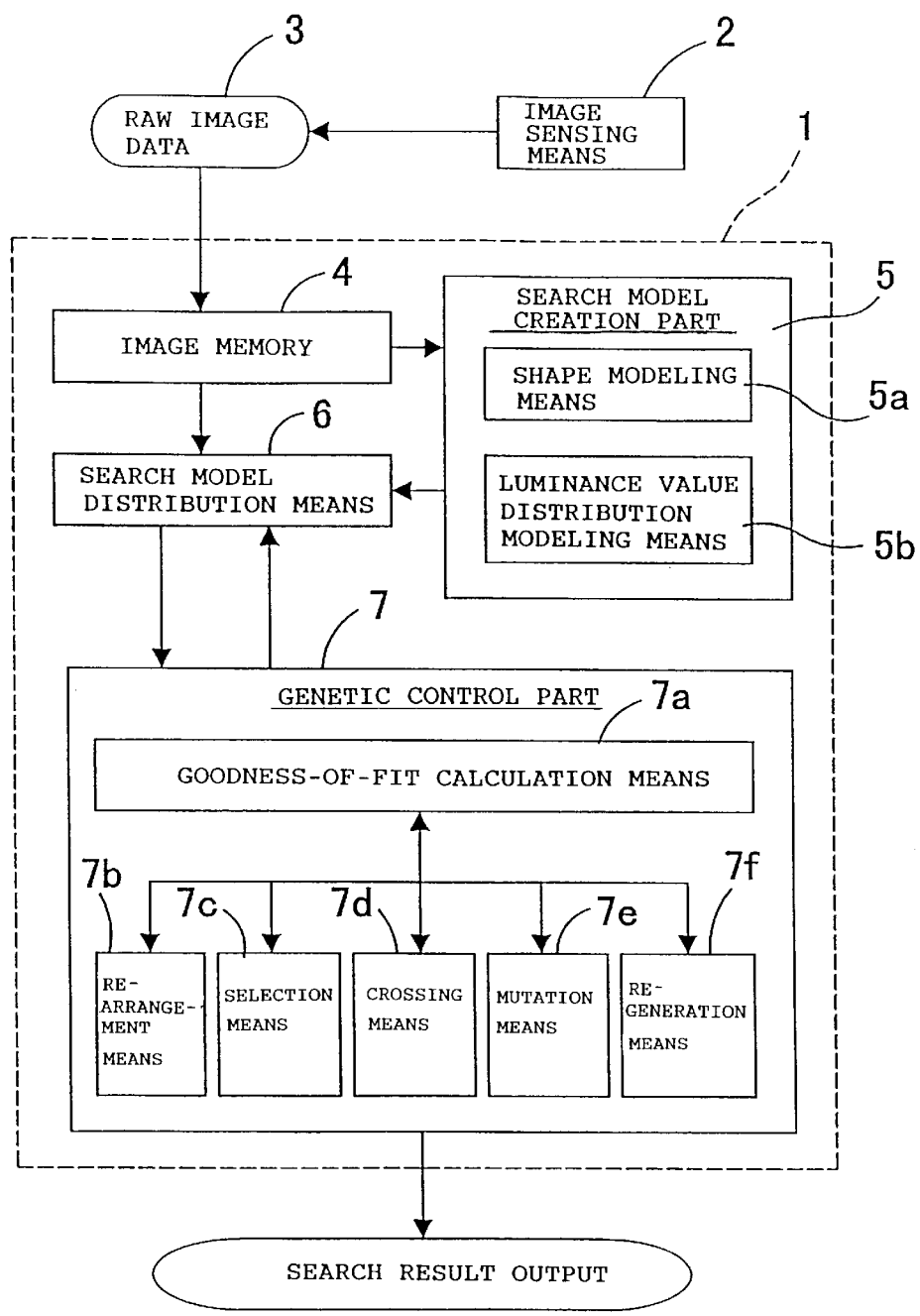
FIG. 1 is a functional block diagram depicting a configuration example of the image recognition equipment in accordance with the present invention.

1 Image recognition equipment
2 Image sensing means
3 Raw image (multi-grayscale image) data
4 Image memory
5 Search model creation part
5a Shape modeling means
5b Luminance value distribution modeling means
6 Search model distribution means
7 Genetic control part
7a Goodness-of-fit calculation means
7b Rearrangement means
7c Selection means
7d Crossing means
7e Mutation means
7f Regeneration means
8 Fish (object)
9 Model shape of fish
10 Search model
11 Search model
11a 11j Search model
12 Object
13 Background image
14 Search model
20 Fish
21 Image data
22 Peak of goodness-of-fit of frame model
23 Peak of goodness-of-fit of plane model
24 Peak of goodness-of-fit of plane-strip model
30 Hand of manipulator
31 CCD camera
32 Tank
33 33b, 33c, 33d, 33e Search model
34a, 34b Search model
35a, 35b, 35c, 35d Search model

DESCRIPTION OF THE PREFERRED EMBODIMENTS

FIG. 1 is a functional block diagram depicting an image recognition equipment in accordance with the present invention. The image recognition equipment 1 in accordance with the present invention comprises an image memory 4 for storing multi-grayscale image data 3 which is shot by the image sensing means 2 and is output (hereafter raw image data), a search model creation part 5 for creating search models in advance by modeling the shape and luminance value distribution of the object, search model distribution means 6 for distributing a plurality of search models in the image sensing area of the raw image data 3 and assigning the position and orientation information to each one of the above search models, and a genetic control part 7 for executing image processing on each one of the distributed search models based on the genetic control, and finally the image recognition equipment 1 outputs the search result of the object included in the raw image data.

The search model creation part 5 further comprises shape modeling means 5a for modeling the object shape into polygons and three-dimensional shapes, and luminance value distribution modeling means 5b for modeling the luminance value distribution of the object. In order to identify the object, fish 8, shown in FIG. 2, for example, the shape of the fish is modeled to a triangular shape 9, and the luminance value distribution of the fish is assigned to the area inside the triangle or the frame part.

The genetic control part 7 further comprises goodness-of-fit calculation means 7a for calculating the goodness-of-fit indicating the correlation between the object included in the raw image data and distributed search models, rearrangement means 7b for rearranging the search models with assigning order of priority based on the above goodness-of-fit, selection means 7c for selecting search models to remain active, crossing means 7d for rearranging and crossing a part of a set or sets of Position and orientation information of the search models, mutation means 7e for randomly changing a part or all of the positional orientation information of the search models in order to cause mutation, and regeneration means 7f for regenerating the search models before the above crossing or mutation.

Figure 3:
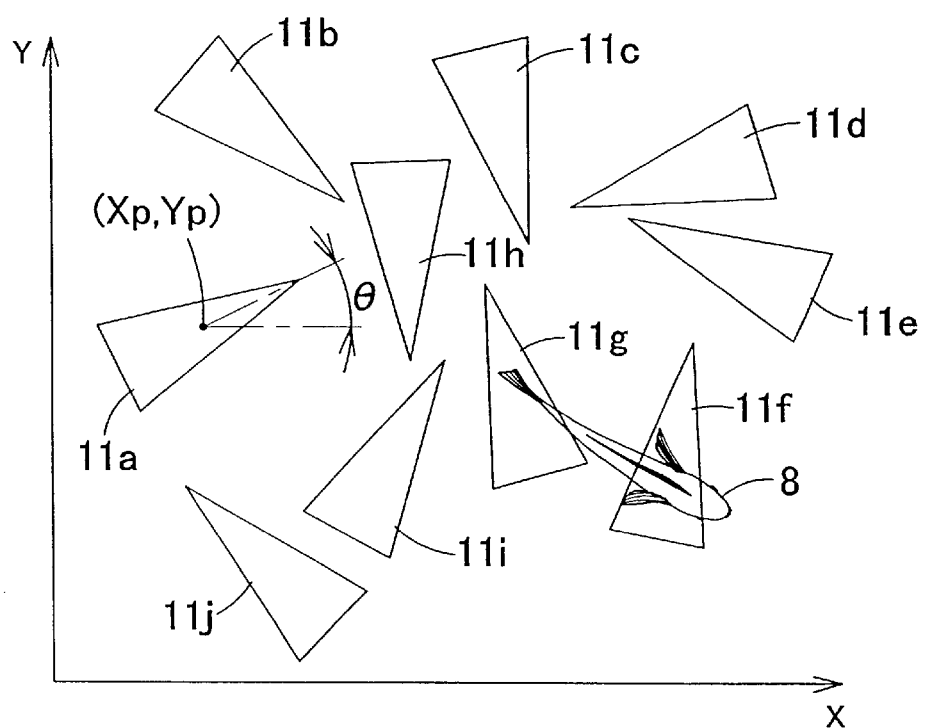
FIG. 3 is a diagram depicting a state where search models are randomly distributed.

In the search model distribution means 6, the plurality of search models 11a, 11b, 11c, . . . are randomly distributed in the image sensing area of the raw image data by setting the positions of the centers of gravity $(X_p, Y_p)$ of the search models us shown in FIG. 3. By this, the search models 11f and 11g, which overlap the object, the fish 8, are obtained.

Figure 4:
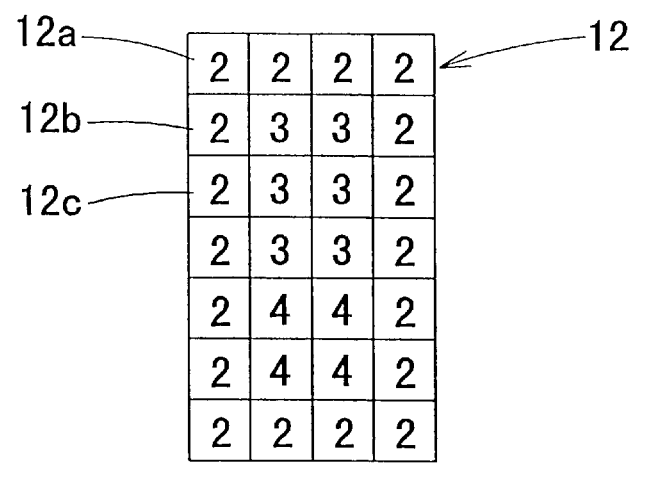

Next, an example of a method for calculating the goodness-of-fit of the search model by the goodness-of-fit calculation means 7a of the genetic control part 7 will be described. As FIG. 4 shows, it is assumed that the shape of the object 12 is square, and the numbers written in squares 12a, 12b, 12c, . . . , which correspond to the pixels of the object 12, indicate the luminance values. For the search model of the object 12, a model having the same shape and same luminance value distribution as the object 12 is used.

It is also assumed that there is input image data which includes the object 12 in the background image 13 where the luminance value distribution is 1, as shown in FIG. 5(a) and (b), land that the search model 14 which overlaps with the object 12 is distributed on this input image data. At this time, the goodness-of-fit of the search model 14 is calculated according to the following procedure. At first, the product of the luminance value of the input image data and the luminance value of the search model 14 is calculated in each overlapping pixel 15, 15, 15, . . . Then the sum of the luminance values of all the pixels in the internal area of the search model 14 is calculated, and this sum of the luminance values is regarded as a goodness-of-fit. Therefore in the case of FIG. 5(a), the goodness-of-fit of the search model is 92, and in the case of FIG. 5(b), the goodness-of-fit of the search model is 156. The goodness-of-fit of a search model which does not overlap with the object is 70, which is the same as the sum of the luminance values of the object shown in FIG. 4. In this way, the correlation, that is, the degree of overlapping between the object and a search model becomes greater, the goodness-of-fit becomes greater, and the goodness-of-fit reaches its peak when the object and the search model match. When the search models 11a, 11b, . . . are distributed in the image sensing area of the input image data, using the same procedure as above, the goodness-of-fit can be calculated for each one of these search models. Based on the goodness-of-fit calculated in this way, the optimum solution of the position and orientation information of the object is searched using the later mentioned GA method.

Figure 6:
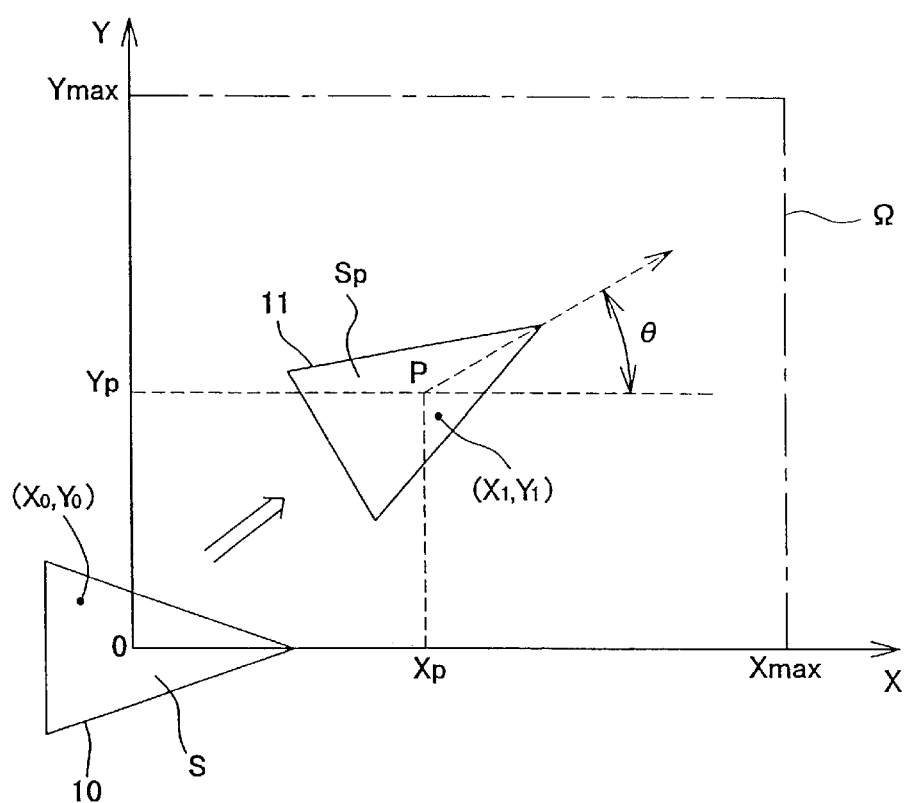
FIG. 6 is an explanatory drawing depicting a two-dimensional shape search model.

Next, the processing content of the search model distribution means 6 and the goodness-of-fit calculation means 7a Will be more fully described. At first, a mathematical method for distributing the search models in the image sensing area of the input image data will be described. FIG. 6 is a schematic diagram for describing a search model with a two-dimensional shape. In the present invention, needless to say the search models can be applied not only to a two-dimensional but to a three-dimensional space as well. As FIG. 6 shows, the image sensing area $\Omega$ is defined as $\Omega = \{(X, Y) | 0 \leq X \leq X_{max}, 0 \leq Y \leq Y_{max}\}$, and it is assumed that the search model 10 which center of gravity is at the origin is created in this sensing area is created. In this embodiment, the position of a search model indicates the position of the center of gravity of the search model. The luminance value m at a point $(X_0, Y_0)$ in the internal area S of the search model 10, including borders, is given by the following formula.

$$m = m(X_0, Y_0) \qquad (1)$$

The luminance value m in this embodiment is 1 within the internal area S (including borders) of the search model, otherwise it is 0. The present invention, however, is not limited to this, for the luminance value m may be a multi-grayscale value which can express shading, as seen in the search model shown in FIG. 5.

Next, a procedure for converting the internal area S of the search model 10 to the area Sp shown in the image sensing area $\Omega$ will be described. A point $(X_0, Y_0)$ inside the internal area S of the search model 10 is converted to a point $(X_1, Y_1)$ inside the internal area Sp of the search model 11, so that the search model 11 after conversion has the orientation angle $\theta$ at the position P $(X_p, Y_p)$.

$$\begin{pmatrix} X_1 \\ Y_1 \end{pmatrix} = T(\theta) \begin{pmatrix} X_0 \\ Y_0 \end{pmatrix} + \begin{pmatrix} X_p \\ Y_p \end{pmatrix} \qquad (2)$$

$$= \begin{pmatrix} \cos\theta & -\sin\theta \\ \sin\theta & \cos\theta \end{pmatrix} \begin{pmatrix} X_0 \\ Y_0 \end{pmatrix} + \begin{pmatrix} X_p \\ Y_p \end{pmatrix}$$

wherein $T(\theta)$ is rotational operator.

Also, according to the above conversion formula (2), the luminance value m $(X_0, Y_0)$ before conversion is converted to the luminance value $m_p (X_1, Y_1)$. The luminance value $m_p (X_1, Y_1)$ of this embodiment is 1 inside the internal area $S_p$ of the search model 11, otherwise it is 0. In this way, by specifying the positional coordinate $(X_p, Y_p)$ and the orientation angle $\theta$, the search models can be distributed in the image sensing area of the input image data according to the above conversion formula (2).

The multi-grayscale luminance value p inside the image sensing area $\Omega$ of the input image data is given by p=p (X, Y).

The goodness-of-fit function F $(X_p, Y_p, \theta)$ for calculating goodness-of-fit of a search model in accordance with the present invention is defined by the following formula (3).

$$F(X_p, Y_p, \theta) = \int p(X, Y) m_p(X_1, Y_1) ds \quad (3)$$

In the above formula (3), ds is an area element in the, image sensing area Ω, and the integrated range is a common area of the image sensing area Ω and the internal area $S_p$ of the search model 11. So if $(X_p, Y_p, \theta)$ is specified, the goodness-of-fit. F $(X_p, Y_p, \theta)$ when a search model is disposed at an arbitrary point $(X_p, Y_p)$ in the image sensing area Ω at orientation angle θ can be calculated. In this embodiment, the integrated value, which is the product of the luminance value of the input image data and the luminance value of the search model, is used as shown in the above formula (3) as an appropriate example to indicate the correlation between the search model and the object, but the goodness-of-fit to indicate the correlation between the search model and the object may be determined using a value determined from the above input image data and the luminance value of the search model. For example, a mean value <m> of the luminance value m of the search model is determined, an absolute value of deviations of this pixel is determined using this mean value <m>, and the sum of the inverse number S of the mean values is regarded as a goodness-of-fit, or more simply, the sum of the input image data p and the luminance value m of the search model or the sum of the absolute value of the difference between the input image data p and the luminance value of the search model can be regarded as a goodness-of-fit.

Figure 7:
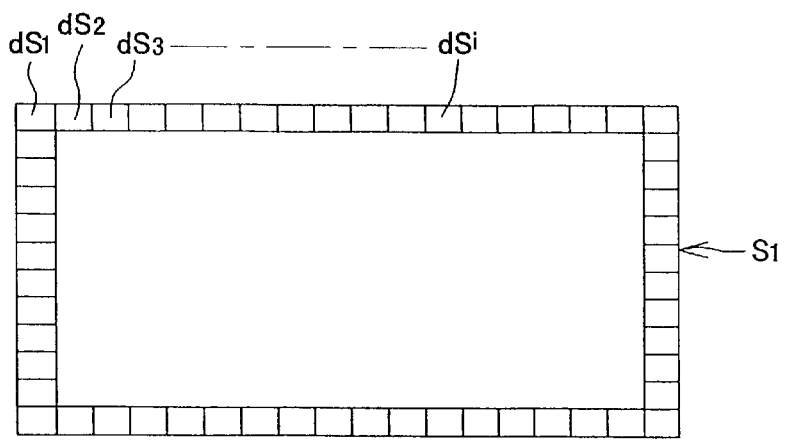
FIG. 7 is a diagram depicting a frame model.

The above value of goodness-of-fit changes depending on how the luminance value distribution is assigned to search models. Preferable search models are (1) a frame model bordering the contour of the object, (2) a plane model matching. the shape of the object, and (3) a plane-strip model where a strip of an additional area is added around the above plane model considering the differential information based on brightness around the object. These models will be described below with reference to FIG. 7–FIG. 9. FIG. 7 is a diagram depicting a frame model, FIG. 8 a plane model, and FIG. 9 a plane-strip model.

In the case of the frame model shown in FIG. 7, the search model is modeled in a rectangular shape and has a luminance value distribution only in the frame area $S_1$. The luminance value in each element $dS_1, dS_2, \ldots dS_i, \ldots$ of the frame area $S_1$ is set to 1, and the luminance values in the other area are set to 0. Therefore the goodness-of-fit function F in the above formula (3) is transformed as follows.

$$F(X_p, Y_p, \theta) = p_1 m_{p1} + p_2 m_{p2} + \ldots + p_i m_{pi} + \ldots \quad (4)$$
$$= p_1 + p_2 + p_3 + \ldots + p_i + \ldots$$
$$= \Sigma_i p_i$$
$$= \text{(Sum of luminance values } p \text{ in the frame area } S_1)$$

In the above formula (4), $p_i$ is a luminance value of the image sensing area 9 corresponding to the i-th element $dS_1$ in the frame area $S_1$, and $m_{pi}$ is a luminance value of the i-th element $dS_i$ in the frame area $S_i$. In this embodiment, the setting is $m_{pi}=1$.

Figure 8:
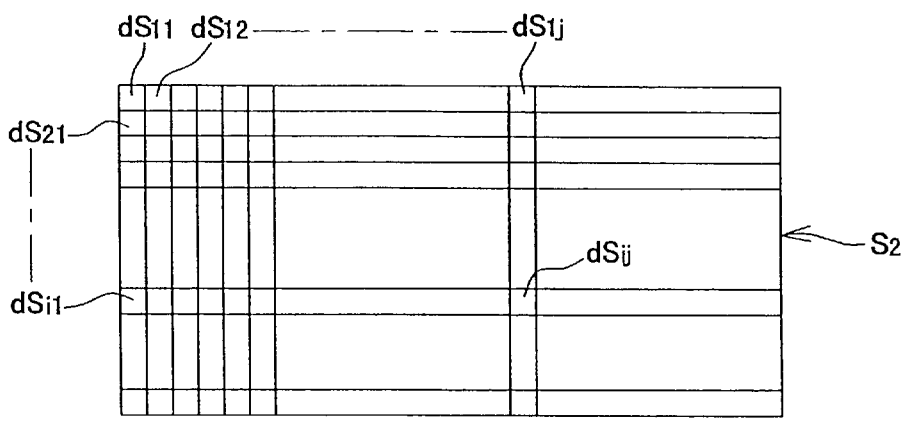
FIG. 8 is a diagram depicting a plane model.

In the case of the plane model shown in FIG. 8, the search model is modeled in a rectangular shape and has a luminance value distribution in the internal area $S_2$. The luminance value of each element $dS_{11}, dS_{12}, \ldots dS_{21}, \ldots$ in the internal area $S_2$ is set to 1, and the luminance values in the other areas are set to 0. Therefore, the goodness-of-fit function F in the above formula (3) is transformed as follows.

$$F(X_p, Y_p, \theta) = p_{11} m_{p11} + p_{12} m_{p12} + \ldots + p_{ij} m_{pij} + \ldots \quad (5)$$
$$= p_{11} + p_{12} + p_{13} + \ldots + p_{ij} + \ldots$$
$$= \Sigma_i \Sigma_j p_{ij}$$
$$= \text{(Sum of luminance values } p \text{ in the internal area } S_2)$$

In the above formula (5), $p_{ij}$ is a luminance value f the image sensing area Ω corresponding to the element $dS_{ij}$ at the i-th row and j-th column in the internal area $S_2$, and $m_{pij}$ is a luminance value of the element $dS_{ij}$ at the i-th row and j-th column in the internal area $S_2$. In this embodiment, the setting is $m_{pij}=1$.

Figure 9:
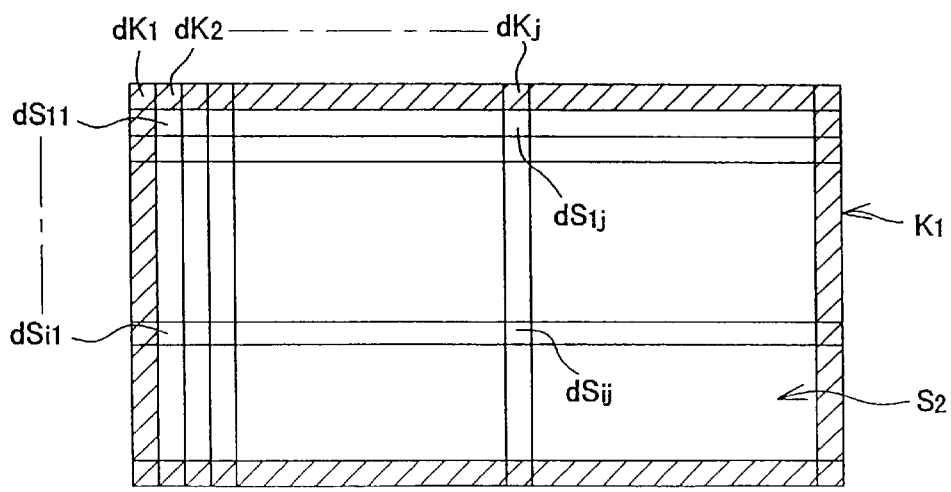
FIG. 9 is a diagram depicting a plane-strip model.

In the case of the plane-strip model shown in FIG. 9, the search model is modeled in a rectangular shape and has a strip of additional area $K_i$ outside the border of the internal area $S_2$ of the plane model, and the luminance value in each element $dS_{11}, dS_{12}, \ldots$ in the internal $S_2$ is set to 1, the luminance value in each element $dK_1, dK_2, \ldots$ of the additional are $K_1$ is set to $-1$, and the luminance values in the other areas are set to 0. Therefore, in the same way as the above formulas (4) and (5), the goodness-of-fit function F of the formula (3) is transformed as follows.

$$F(X_p, Y_p, \theta) = \Sigma_i \Sigma_j p_{ij} - \Sigma_k p'_k \quad (6)$$
$$= \text{(Sum of luminance values } p \text{ in the internal area } S_2)$$
$$= \text{(Sum of luminance values } p' \text{ in the additional area } K_1)$$

In the above formula (6), $P_{ij}$ is a luminance value of the image sensing area Ω corresponding to the element $dS_{ij}$ at i-th row and j-th column in the internal area $S_2$, and pk' is a luminance value of the image sensing area Ω corresponding to the k-th element $dK_k$ in the additional area $K_1$. In this way, disposing a strip of additional area and setting the luminance value distribution in this additional area to be a negative value, the change of luminance value of the area around the object is considered in the goodness-of-fit function of the plane-strip model, therefore the object can be accurately detected.

The above frame model, plane model and plane-strip model are modeled in a rectangular shape, but the present invention is not limited to this, and can be modeled in various shapes, such as a triangular shape and a three-dimension shape. Also for this embodiment, three values, 0, 1 and −1 are used as the luminance values of the search models, but the present invention is not limited to this, where multi-grayscale values to express shading can be used. When multi-grayscale values are used for the luminance values of the search models, the goodness-of-fit can be determined not by the above formulas (4), (5) and (6) but by the sum of the products of the luminance values m of the search models and luminance value p of the input image data.

Figure 2:
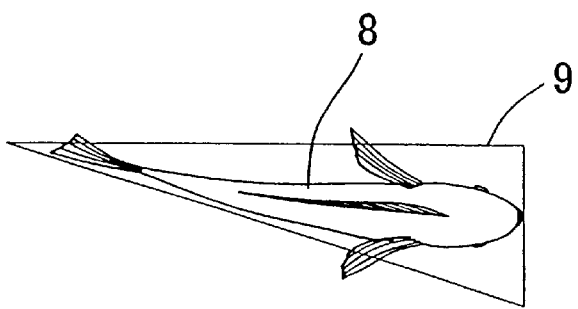
FIG. 2 is a schematic diagram depicting a fish, which is an object, and a search model corresponding to this fish.
Figure 10:
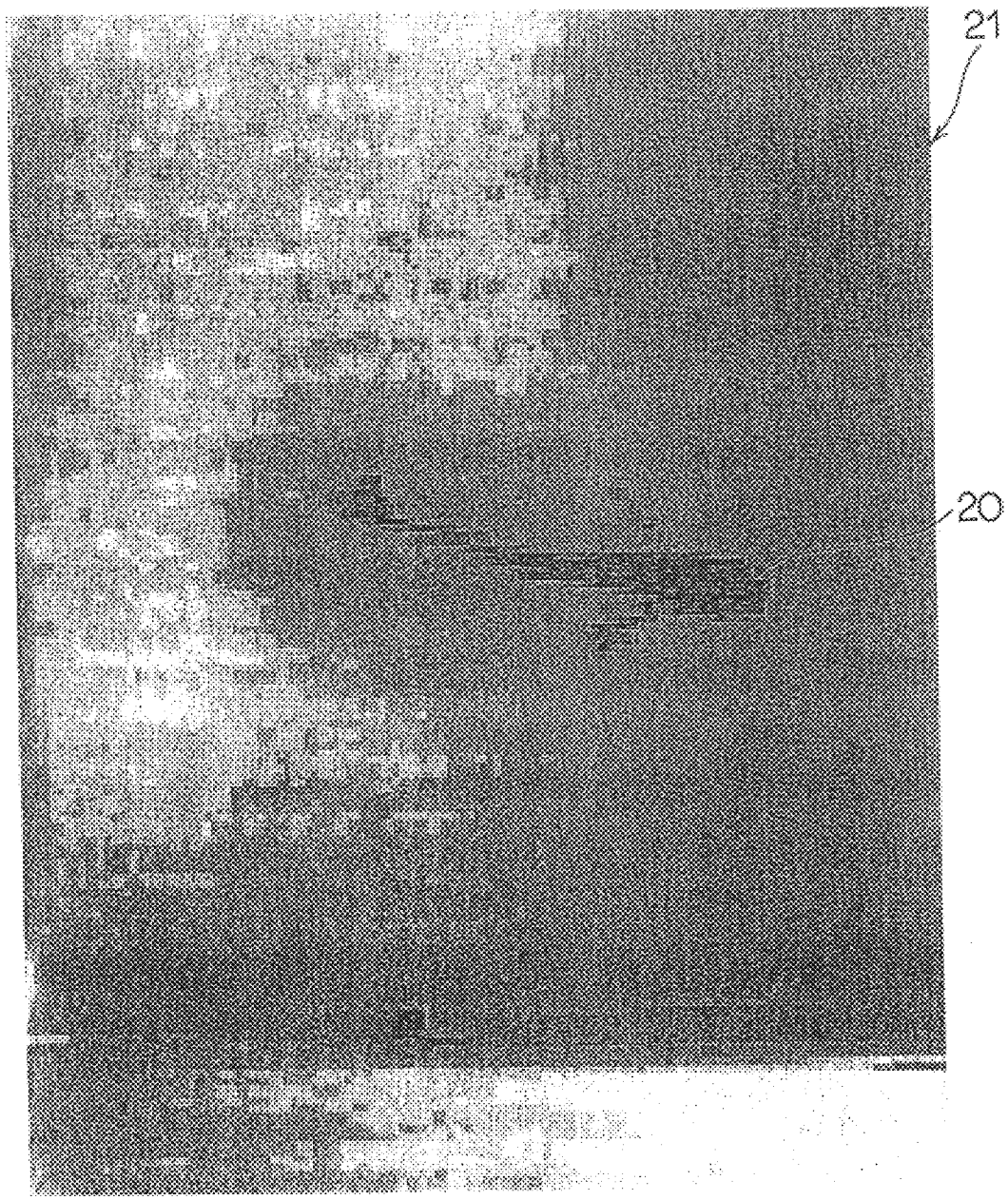
FIG. 10 is image data when an image of a fish swimming in a tank is shot from the top.
Figure 11:
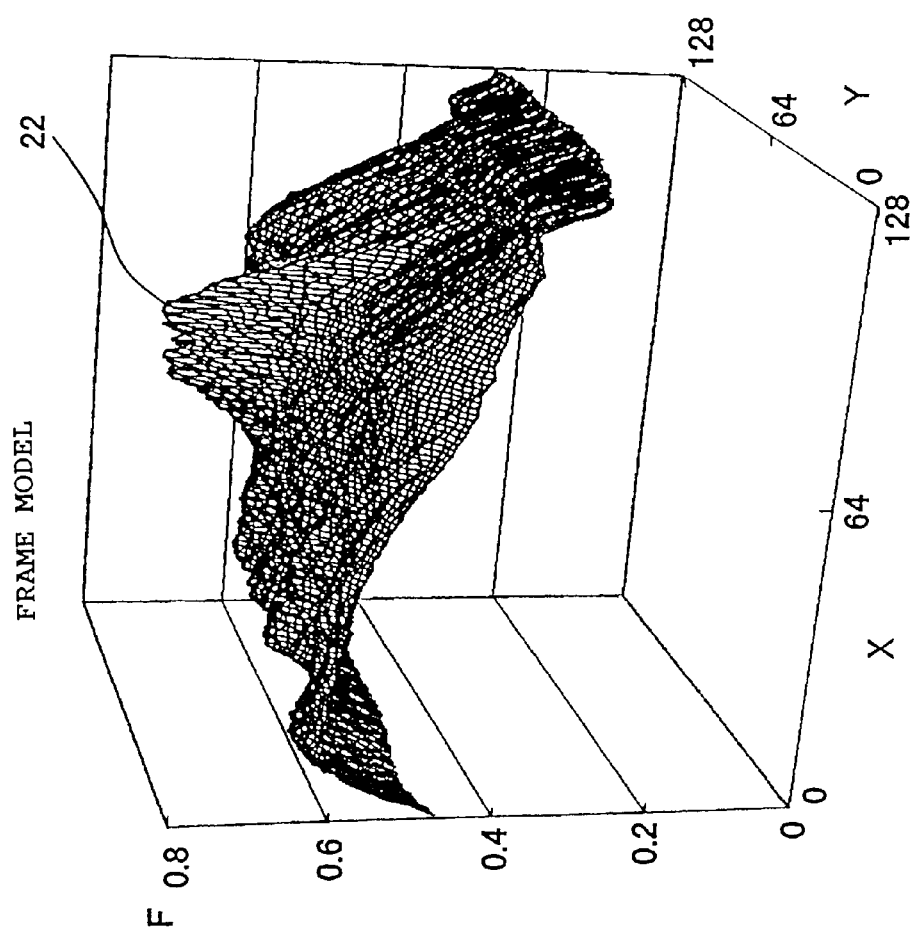
FIG. 11 is a three-dimensional graph depicting a result when a goodness-of-fit is calculated using a frame model.
Figure 12:
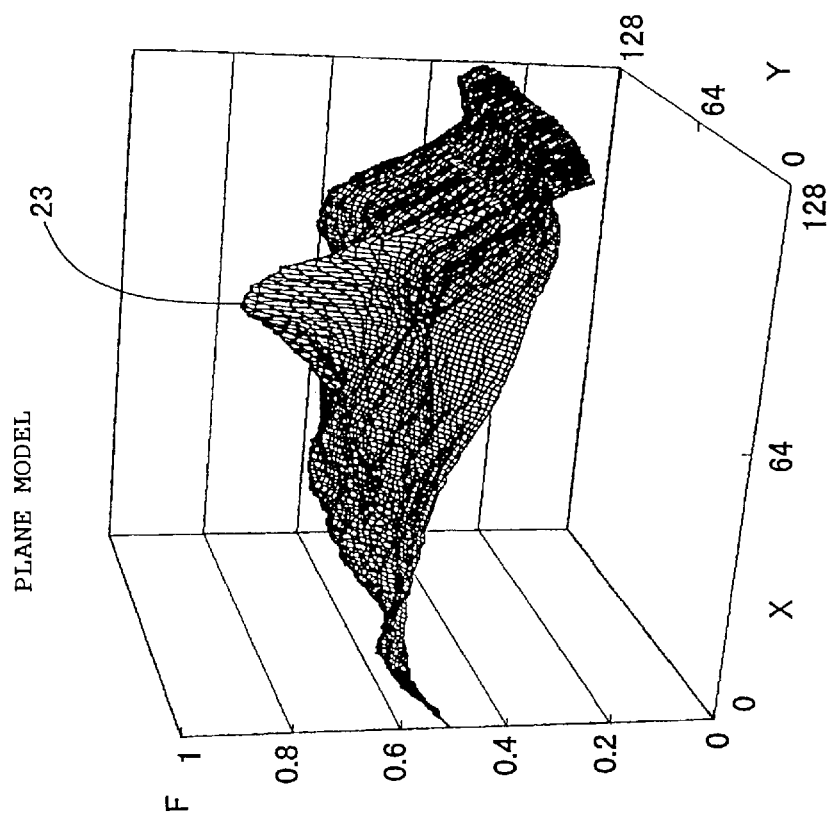
FIG. 12 is a three-dimensional graph depicting a result when a goodness-of-fit is calculated using a plane model.
Figure 13:
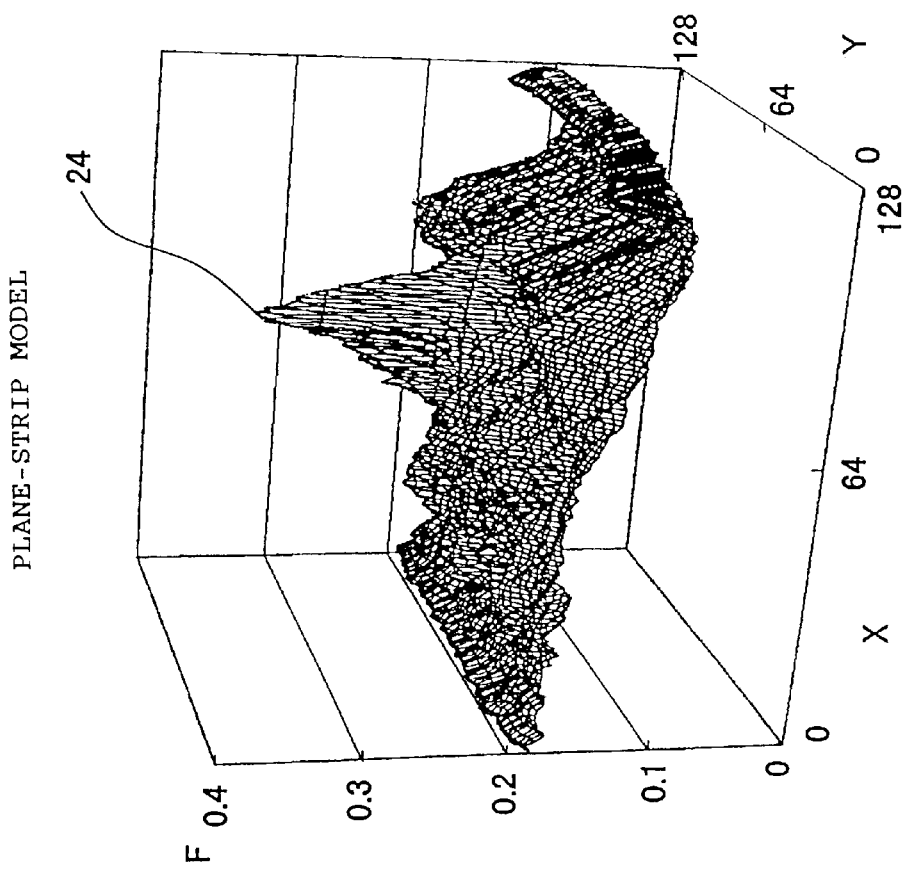
FIG. 13 is a three-dimensional graph depicting a result when a goodness-of-fit is calculated using a plane-strip model.

In order to validate the effect of the above frame model, plane model and plane-strip model, the goodness-of-fit of the image data 21 (128×128 pixels) on the fish 20 swimming in the tank is shot from the top, as shown in FIG. 10, was calculated for each pixel by using the goodness-of-fit functions of the formulas (4) to (6) above, and the result was created into a three-dimensional graph. The shape of the search model is triangular, as shown in FIG. 2, and the orientation angle θ was set to 0. For the goodness-of-fit, a normalized value was used. The results are shown in FIG. 11 (frame model), FIG. 12 (plane model) and FIG. 13 (plane-strip model).

As these figures show, the goodness-of-fit increases as the search model approaches the position of the fish 20, and reaches the peak when the search model overlaps with the fish 20. In the case of the frame model shown in FIG. 11, the difference of goodness-of-fit between the object (fish) and the background image (water surface) is small, but a peak 22 appears near the object, whereas in the case of the plane model shown in FIG. 12, a gentle peak 23 appears, and in the case of the plane-strip model shown in FIG. 13, a sharp peak 24 appears. Therefore in this case, the position and orientation of the object can be most accurately detected with the plane-strip model, but the sharp peak means that it takes more time to detect the position and orientation compared with the frame model and plane model. With the plane model which has a gentle slope near the peak, on the other hand, it takes little time to obtain a solution around the peak, since this model is flexible with small deviations.

Next, a genetic control in the genetic control part 7, that is, a search method using a GA (Genetic Algorithm) will be described. GA is an artificial model used to simulate the evaluation mechanism advocated by J. H. Holland and others in the USA who learned from the adaptation process in living systems in nature based on genetic information and natural selection. The references on GA include: "J. H. Holland: Adaptation in Natural and Artificial Systems, Univ. of Michigan Press (1975), MIT Press (1992)", "D. E. Goldberg: Genetic Algorithms in Search, Optimization and Machine Learning, Addison Wesley (1989)", Ankyoin, Nagao: Genetic Algorithms, pp. 53–81, Shokodo (1993)", and "Nobuo Sannomiya, Hajime Kita, Hisashi Tamaki, Takashi Iwamoto: Genetic Algorithms and Optimization, compiled by the System Control Society, Asakura Shoten (1998)".

Figure 14:
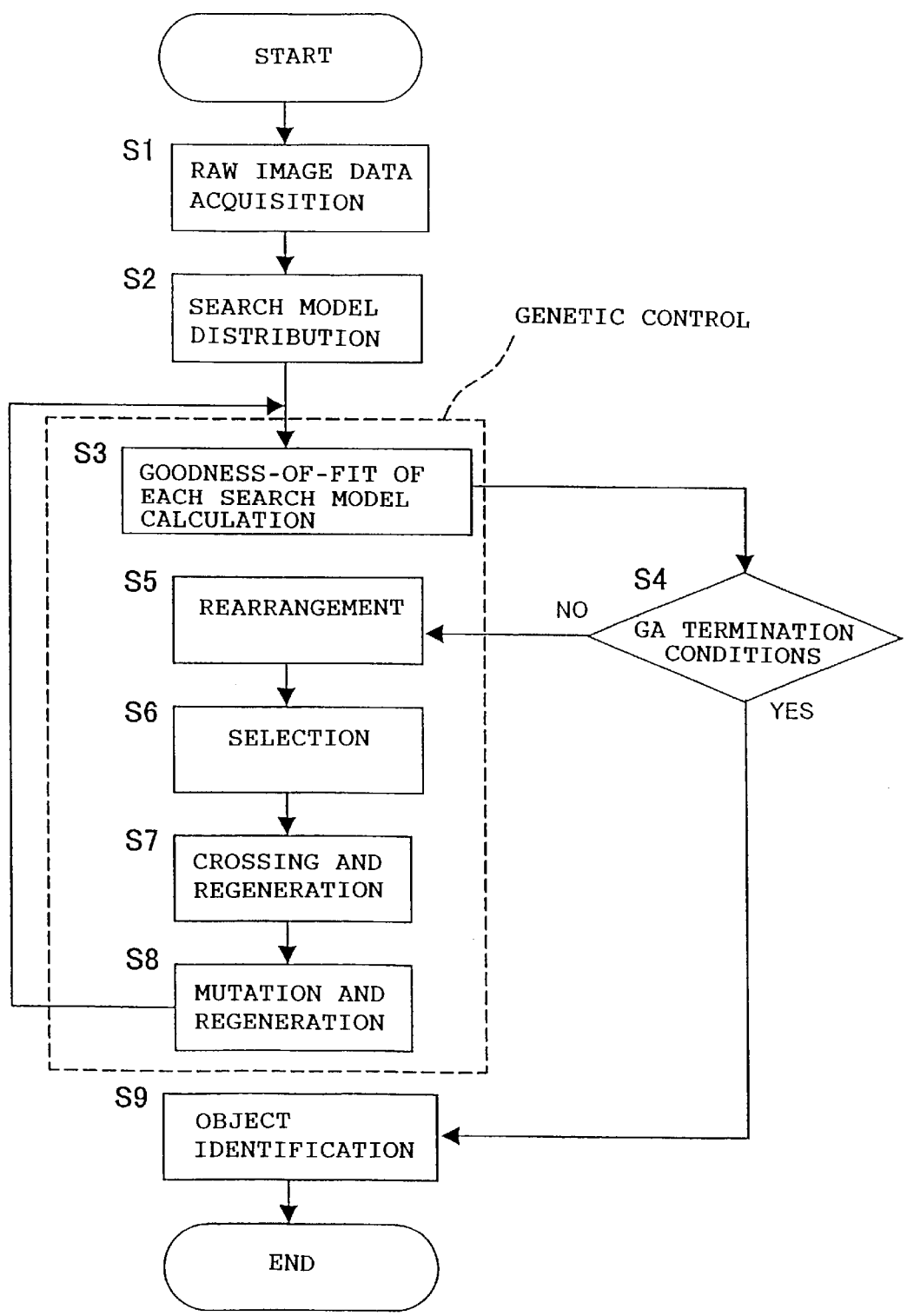
FIG. 14 is a flow chart depicting an embodiment of search processing using GA.

With reference to FIG. 14, an example of search processing using GA will be described next. At first, raw image data, including the object, is obtained from an image sensing means, such as a CCD camera, and is stored in the image memory (Step 1). Then a plurality of search models are randomly distributed in the image sensing area of the raw image data, the position and orientation information is assigned to each one of the search models as individual information, and these search models are regarded as first generation individuals (Step 2). Specifically, the respective position and orientation of each search model is randomly generated using pseudo-random numbers or physical random numbers, and a set of first generation search models is generated. For example, 23 bits of the binary data array shown in FIG. 15 is prepared for each search model, where the first 7 bits are allocated to a position in the X direction (X), next 7 bits are allocated to a position in the Y direction (Y), and the last 9 bits are allocated to an orientation (θ) and the numeric values of (X, Y, θ) are randomly generated.

Next, the goodness-of-fit for each one of the above search models is calculated using the above mentioned goodness-of-fit function (Step 3). Then it is determined whether this search processing is terminated based on the later mentioned "GA termination conditions" (Step 4), and if the search processing is continued, the first generation search models are "rearranged" in the sequence of goodness-of-fit (Step 5). In this way individuals having a higher goodness-of-fit are "selected" and survive (Step 6). Also, a part of the position and orientation information of a set or sets of search models, out of the selected search models, are recombined and "crossed" at a predetermined probability (Step 7). In addition to the crossed search models, a part of the search models before crossing may be "regenerated" here (Step 7).

Next, a part or all of the position and orientation information of the search models which are crossed or regenerated in this way are randomly changed for "mutation" (Step 8). In addition to the mutated search models, a part of the search models before mutation may be "regenerated" (Step 8). For example, in the case of the position and orientation information in FIG. 15, a part or all of each bit string of the positions X and Y and orientation θ are "mutated". Mutating the lower bit string of the positions X and Y, in particular, is effective for a local search where the search range is restricted, and mutating the entire bit string is effective for a global search.

At the end of the above genetic control, the second generation individuals are generated. Then the second generation individuals are fed back and the above mentioned Step 3 and later genetic control is executed repeatedly. Here, "GA termination conditions" (Step 4) is set, for example, to terminate the search processing when the goodness-of-fit matches the condition to reach a peak (condition when the slope of goodness-of-fit becomes a negative near the solution of the position and orientation information). GA termination condition may be set to terminate the search processing when the goodness-of-fit converges to a threshold value or more even if the goodness-of-fit reaches the peak, or terminating the search processing after one generation to several generations of short cycles have elapsed without waiting for the convergence of the goodness-of-fit. Particularly when a real-time operation is required, it s preferable to regard the position and orientation information of a search model having the highest goodness-of-fit as the optimum solution without waiting for the convergence of the goodness-of-fit.

It is not always necessary to execute genetic control in the sequence of "rearrangement "selection", "crossing and regeneration" and "mutation and regeneration", as shown in this embodiment, but one, two or more types of control out of these may be used combined in an appropriate sequence.

Figure 16:
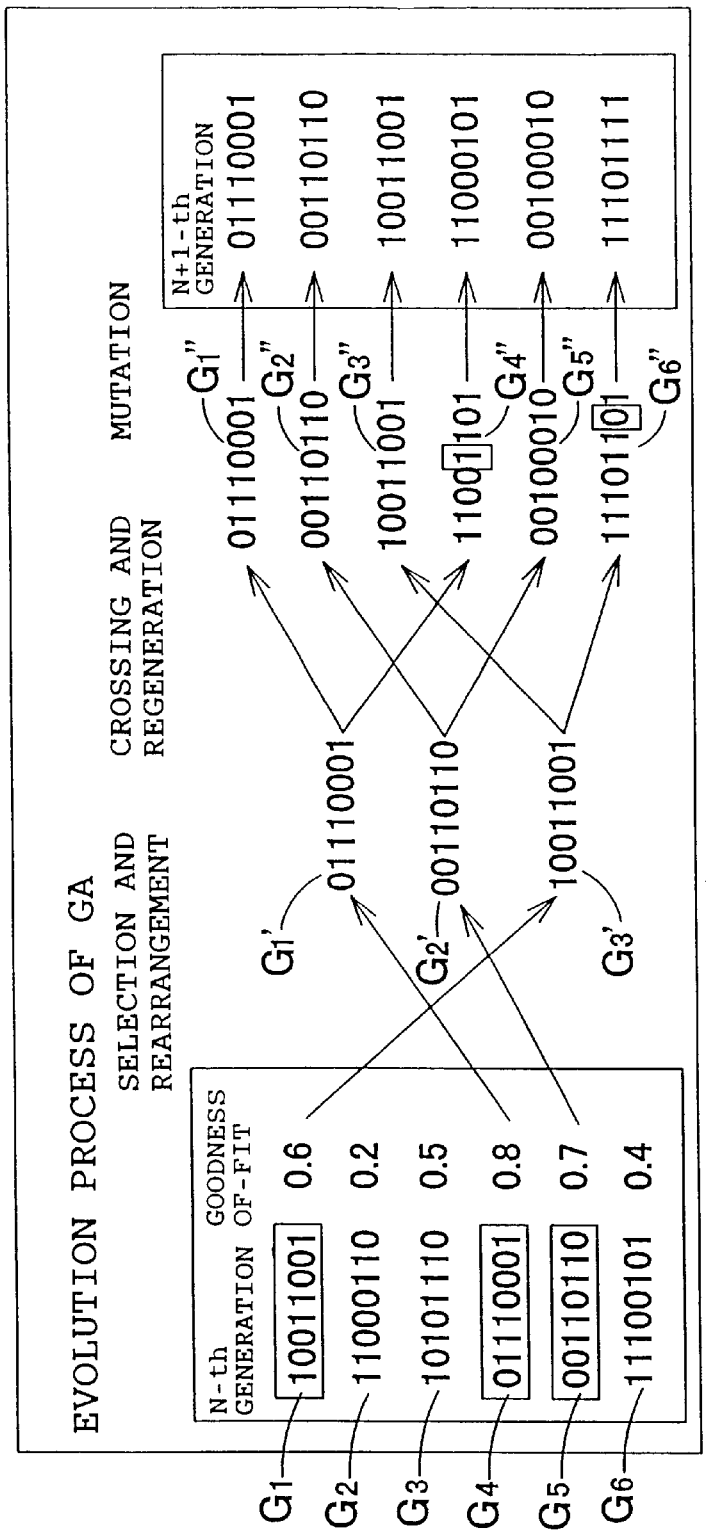
FIG. 16 is an explanatory drawing depicting an embodiment of a genetic control.

As a more concrete embodiment, genetic control using the position and orientation information comprised of 8-bit binary data array will be described with reference to FIG. 16. At first, it is assumed that there is position and orientation information $G_1$, $G_2$, . . . $G_6$ of the N-th generation search models, then the position and orientation information $G_1$, $G_4$ and $G_5$, which have the highest third goodness-of-fit out of these search models are selected as information on superb individuals, and are rearranged in the sequence of goodness-of-fit so as to generate the position and orientation information $G_1'$–$G_3'$. Then a part of this position and orientation information $G_1'$–$G_3'$ are crossed by mutually recombining so as to generate the position and orientation information $G_4''$, $G_5''$ and $G_6''$, and at the same time, the position and orientation information before crossing, that is, $G_1'$–$G_3'$, are regenerated so as to generate the position and orientation information $G_1''$, $G_2''$ and $G_3''$. And based on an appropriate probability, the position and orientation information $G_4''$ and $G_6''$ are selected, then the lower 3 bits of $G_4''$ are mutated from "0" to "1", the lower 1 bit of $G_6''$ is mutated from "1" to "0", and the N+1th generation individuals (search models) are generated.

Figure 17:
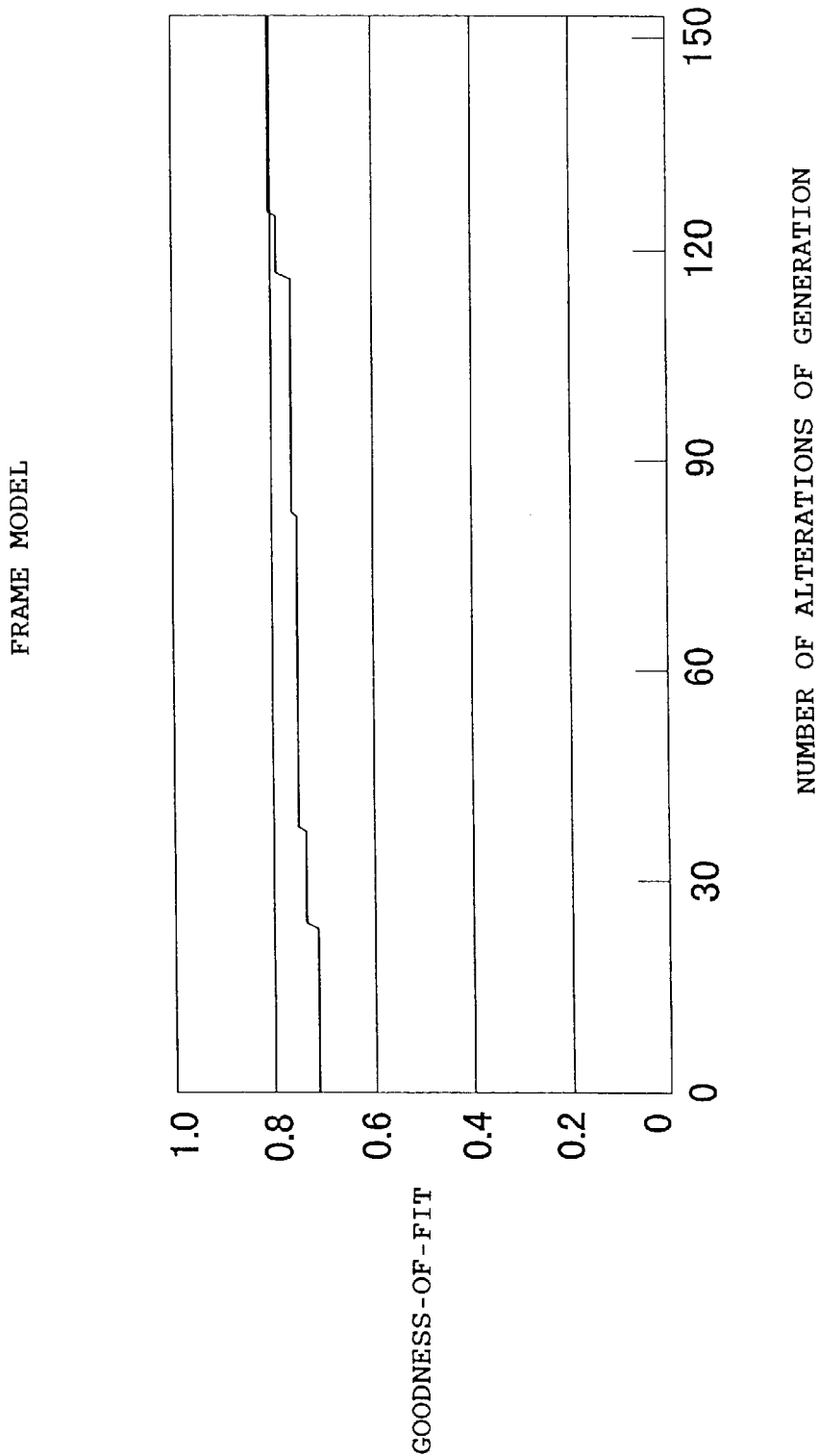
FIG. 17 is a graph depicting a goodness-of-fit vs. number of alterations of generation when a frame model is used.
Figure 18:
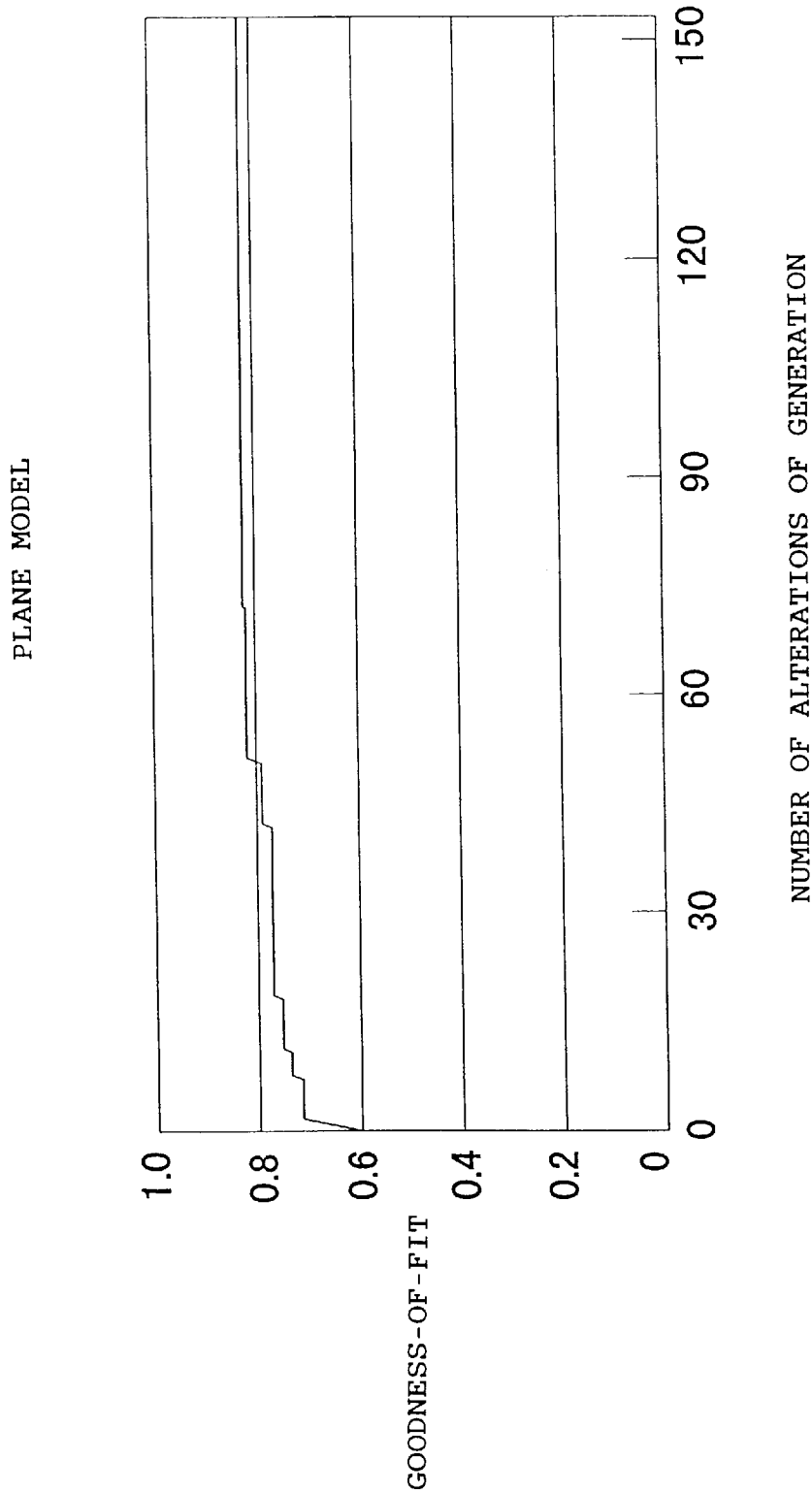
FIG. 18 is a graph depicting a goodness-of-fit vs. number of alterations of generation changes when a plane model is used.
Figure 19:
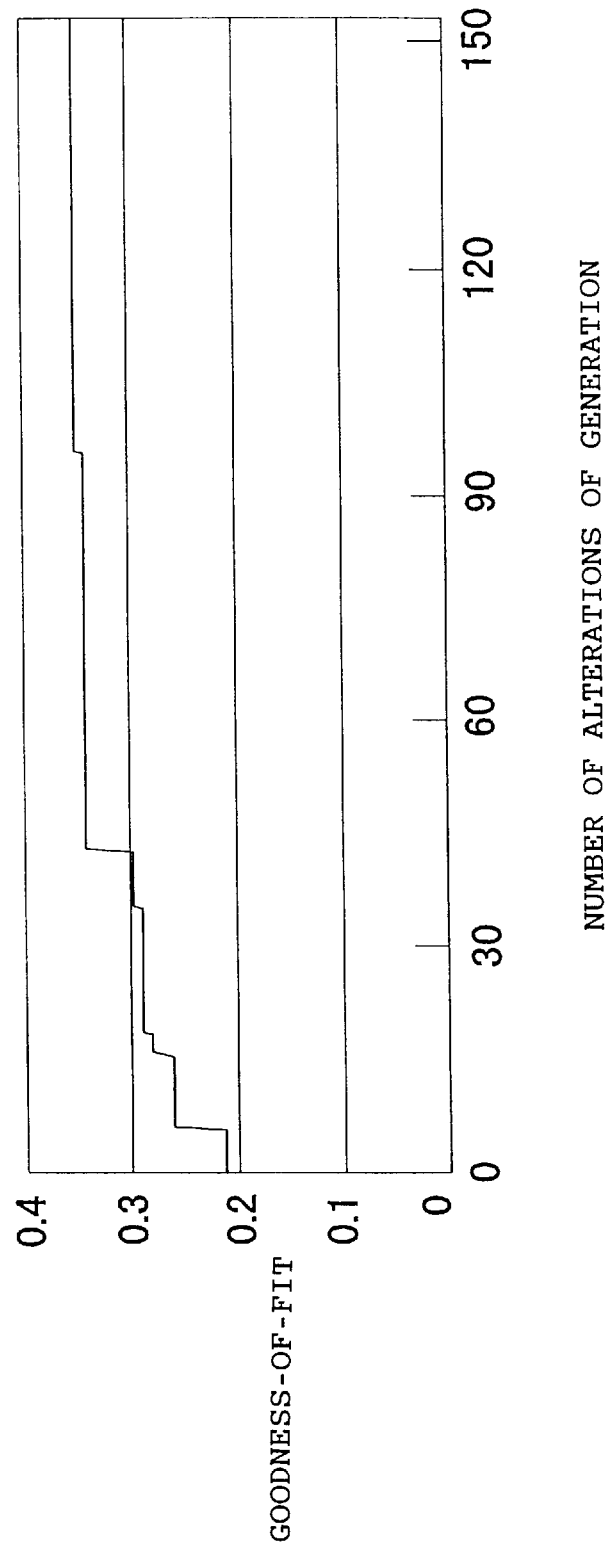
FIG. 19 is a graph depicting a goodness-of-fit vs. the number of alterations of generation when a plane-strip model is used.

Genetic control was actually performed based on the flow shown in FIG. 14 using the multi-grayscale image shown in FIG. 10. The result is shown in FIG. 17 (frame model), FIG. 18 (plane model) and FIG. 19 (plane-strip model).

In each graph, the abscissa indicates the "number of alternations of generations" and the ordinate indicates the highest goodness-of-fit" among the search models existent in each generation. The graph of the frame model shown in FIG. 17 has a gentle curve, and converges to about 0.8 at around the $130^{th}$ generation, and the graph of the plane model shown, in FIG. 18 converges to about 0.82 at around the $70^{th}$ generation, presenting very good convergence. In the graph of the plane-strip model shown in FIG. 19, on the other hand, convergence is good up to around the $40^{th}$ generation, but declines in later generations since the curve ascends very gently. For all of the plane model, frame model and plane-strip model, the object was detected and the peak of goodness-of-fit was generated regardless the fluctuation of environmental conditions, such as illumination, and regardless the changes of the level of goodness-of-fit.

In this way, the present invention can search position information and orientation information of an object using raw image data without using binary images like a conventional search method.

Next, a method of limiting the search range for an object includes in the input image data by adding constraints to the evolution of the position and orientation information of the distributed search models will be described with reference to FIG. 20–FIG. 22.

Figure 20:
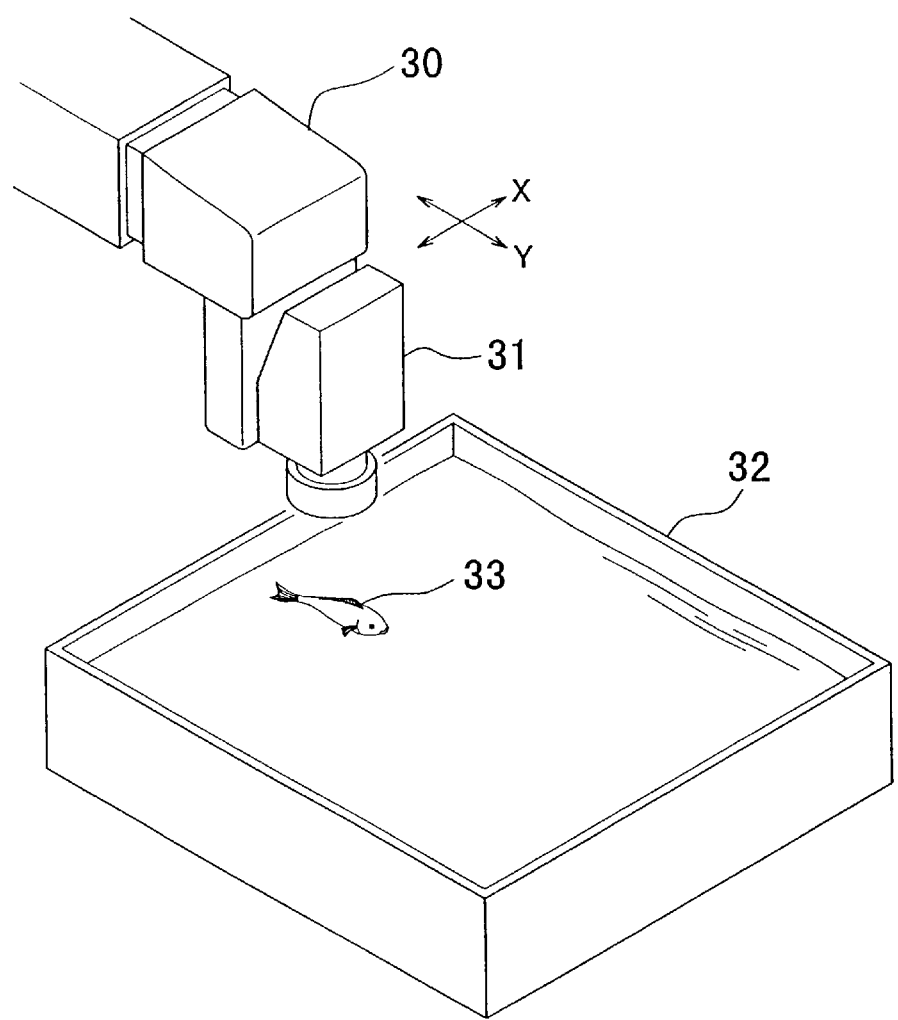
FIG. 20 is a schematic diagram depicting a state when a fish in a tank is caught and traced with a CCD camera secured to the hand of a manipulator.

As FIG. 20 shows, there is a visual servo-mechanism where a CCD camera 31, secured on the hand 30 of the manipulator which is driven in the X-Y direction, is moved above the fish 33 swimming in the tank 32, so as to trace the fish. Since the object, the fish 33, always moves, it is difficult to predict the movement. So, if the convergence of goodness-of-fit of the individuals (search models) waited for a predetermined time and the hand 30 is then moved to a position based on the instructed value, the fish may no longer exist there. Therefore it is preferable that a search model which has the highest goodness-of-fit among the search models, after a short cycle of the first generation to several generations, is regarded as the optimum solution without waiting for convergence of the goodness-of-fit, so as to improve the speed of searching a solution, and the position and orientation information of the search model is instructed to the manipulator.

Figure 21:
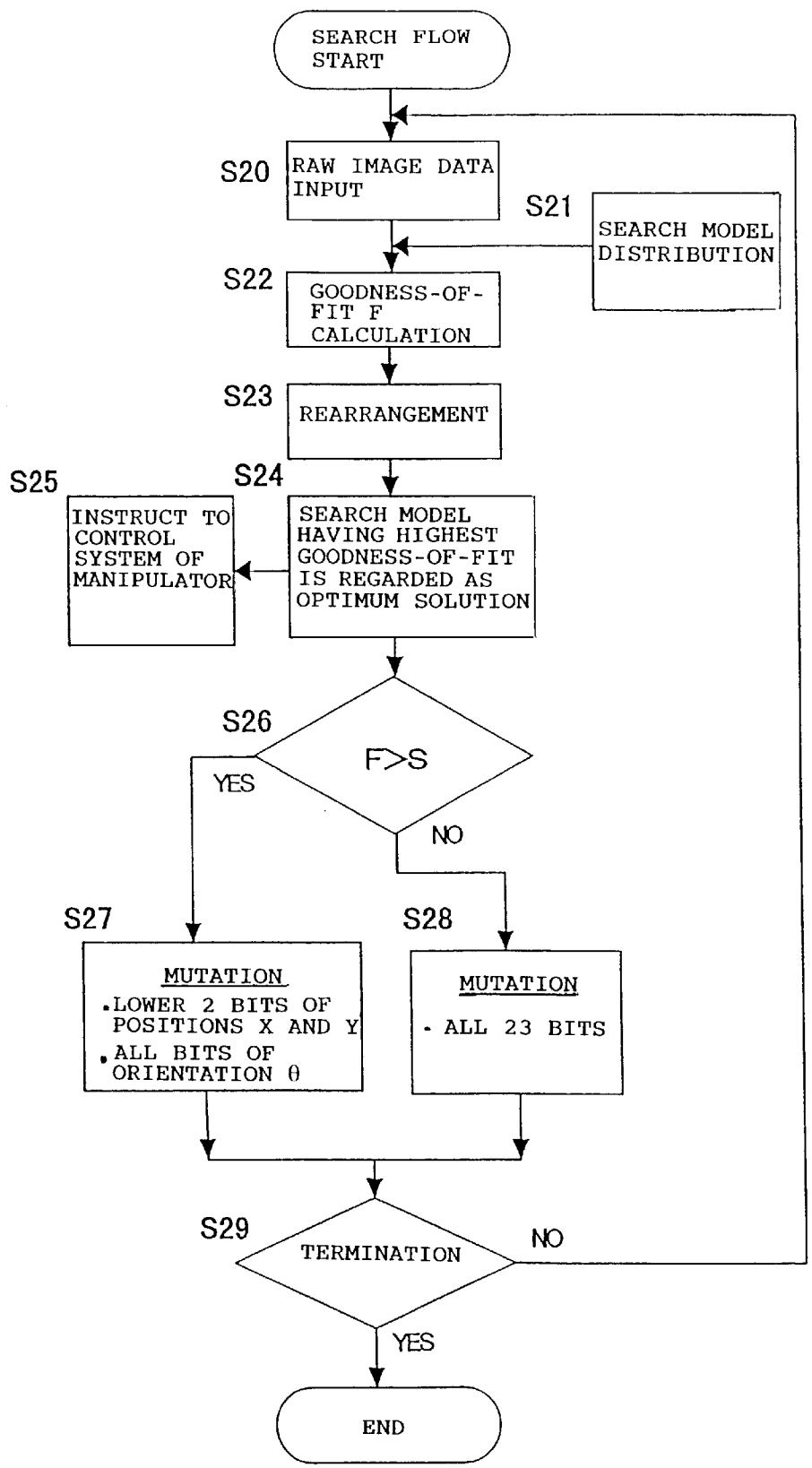
FIG. 21 is an embodiment of a control flow of the visual servo-mechanism in accordance with the present invention.
Figure 22:
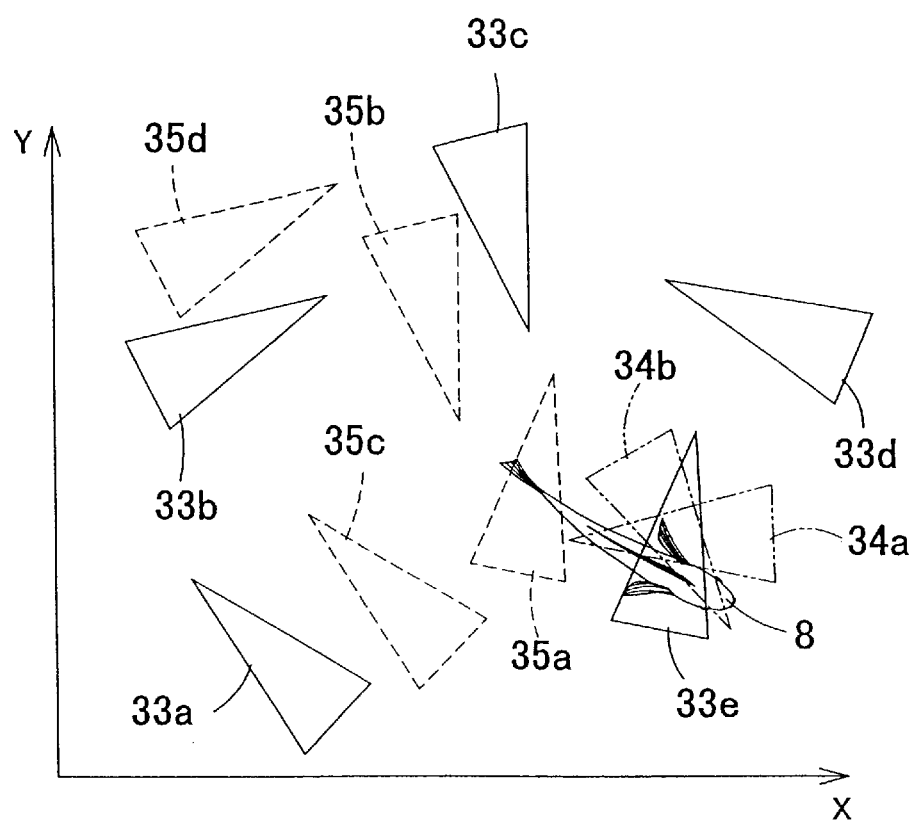
FIG. 22 is a diagram depicting a state when the search models are randomly distributed.
Figure 23:
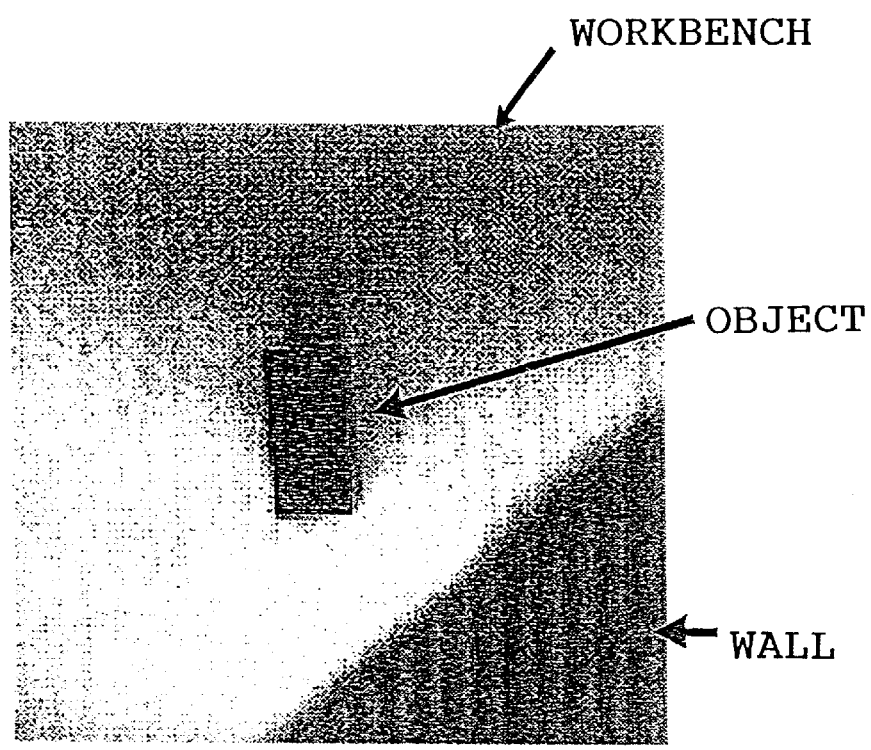
FIG. 23 is an image when a square object placed on a workbench and a wall are shot from the top.
Figure 24:
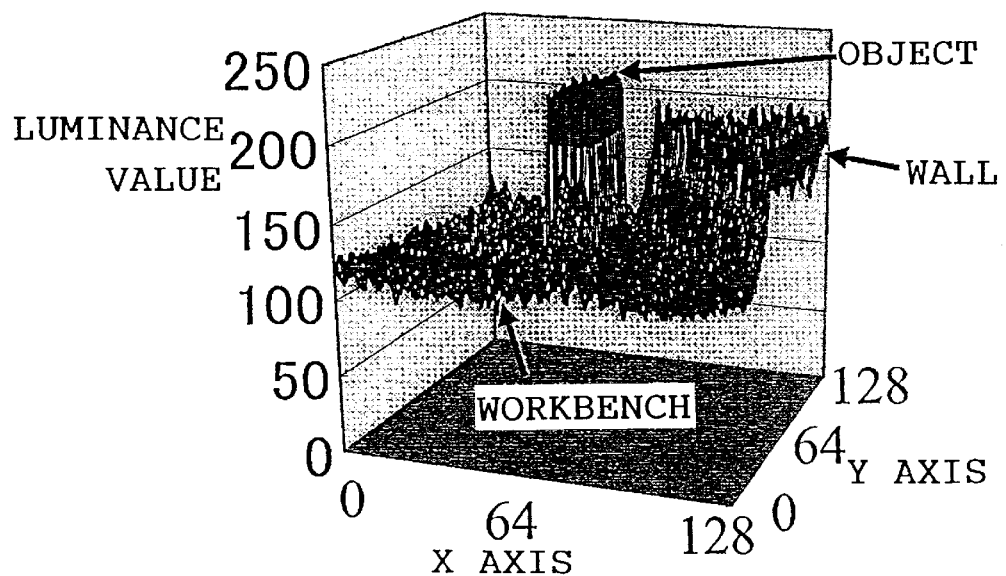
FIG. 24 is a graph depicting the luminance value distribution of the multi-grayscale image shown in FIG. 23.
Figure 25:
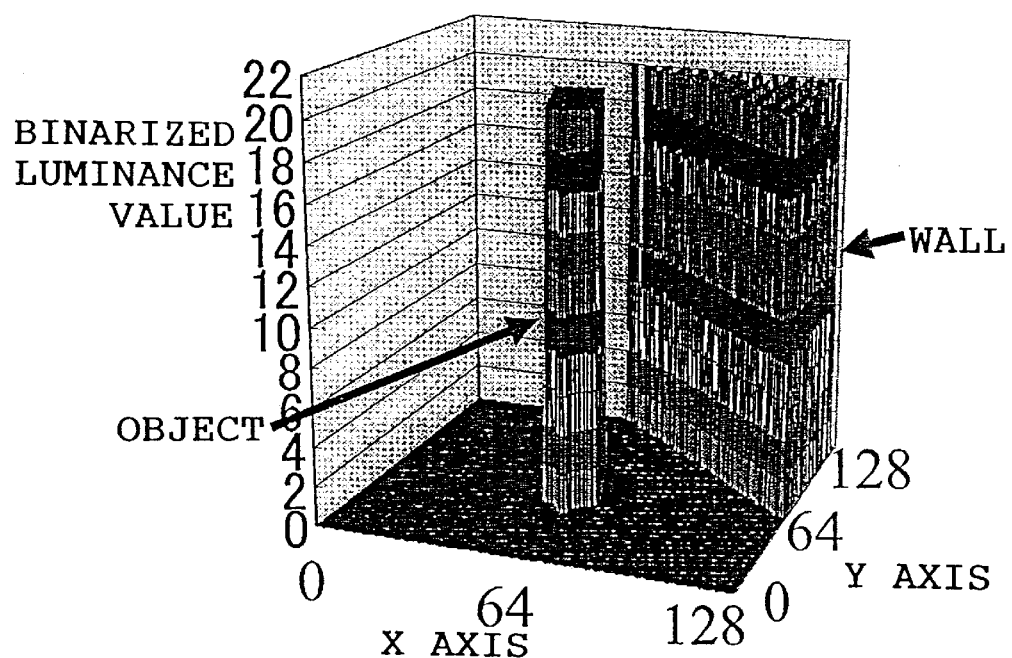
FIG. 25 is a graph depicting the luminance value distribution of the binary image, which is the multi-grayscale image shown in FIG. 23, after it is binarized.

FIG. 21 is an embodiment of the control flow of such a visual servo-mechanism. When the raw data, including the object output from the CCD camera 31, is input (Step 20), many search models 33a, 33b, 33c, 33d and 33e are randomly distributed throughout the entire image sensing area of the raw image data, as shown in FIG. 22 (Step 21). Here, a binary data array comprised of 23-bits as shown in FIG. 15 is used for the position and orientation information of the search models, where 7 bits are allocated to the position X, 7 bits to the position Y, and 9 bits to the orientation angle θ. Then, the goodness-of-fit F is calculated for each search model (Step 22), priority is assigned to the search models, rearranging them in the sequence of goodness-of-fit (Step 23), a search model having the highest goodness-of-fit is regarded as the optimum solution (Step 24), the position and orientation information on this search model is instructed to the control system of the manipulator (Step 25), and the CCD camera 31 is moved to this position.

Next, it is determined whether the goodness-of-fit F exceeds the predetermined set value S for each one of the search models (Step 26), then if the goodness-of-fit F exceeds the value S, this search model is regarded as a probable individual and the lower 2 bits of the position X and the position Y respectively and all the bits of the orientation angle θ among the position and orientation information are randomly changed in order to cause mutation (Step 27), and if the goodness-of-fit F is the threshold value S or less, the individual is regarded as unnecessary, and all 23 bits of the position and orientation information of this search model are randomly changed in order to cause mutation (Step 28). In other words, a value S is set in advance such that the goodness-of-fit F of a search model 33e, which significantly overlaps with the object 8, sufficiently exceeds the value S, as shown in FIG. 22, then if a search model meets this condition, the position and orientation information of the search model 33e is locally mutated in the Step 27 so as to generate the search models 34a and 34b shown by the two-dot chained lines, near the probable individual, and for the search models 33a, 33b, 33c and 33d, which do not overlap with the object and have the goodness-of-fit F which is less then the value S, all the position and orientation information of the search models 33a, 33b, 33c and 33d are mutated in the Step 28, so as to generate new search models 35a, 35b, 35c and 35d shown by the dotted lines. In this way, the mutation in the Step 27 is effective to search the object locally, and the mutation in the Step 28 is effective to search the object globally.

The new search models generated in this way are stored in the image memory, and when raw image data output from the CCD camera 31 is input again (Step 20), the search models stored in the image memory are fed back, the goodness-of-fit F is calculated for these search models (Step 22), and the processing in Steps 23, 24, . . . is executed repeatedly as mentioned above. The visual servo-mechanism based on such feedback control executes the global search (Step 27) and the local search (Step 28) simultaneously, and obtains the optimum solution without waiting for convergence of the goodness-of-fit (Step 24), so it is possible to accurately recognize and trace the object at very high-speed In the above embodiment, search models, where all shape and luminance value distributions of the object are modeled, are used, but the present invention is not limited to this and search models where a part of the shape and luminance value distributions of the object, including characteristic points, are extracted and modeled, may be used.

Another application example involves applying the image recognition method in accordance with the present invention to human face image collation processing. Specifically, the face image, which is the object, is input as multi-grayscale input image data, and this face image and search models registered in the database are pattern-matched using the above mentioned image recognition method. Here, search models where a plurality of characteristic points (e.g. ridge of the nose, lines of eyes and mouth) are extracted from the registered face images are prepared. So a plurality of search models are prepared for each one of the registered face images. And the face image, which is the object, and the search models including the characteristic points, are sequentially pattern-matched. If the image recognition method in accordance with the present invention is used, image processing is executed at high-speed without involving binary processing, so collation processing for an enormous number of registered face images can be executed at very high-speed.

For the above mentioned raw images, not only monochrome but also color images using multi-color signals can be processed in the same way.

For the above mentioned raw image data, not only digital image data, which is output from such digital equipment as a CCD camera, but also A-D converted analog image data, which is output from a video for example, can be used.

In this way, according to the image recognition method of the present invention, a function value to indicate the correlation with the object is determined for each one of the search models distributed in the area of the input image data, and the search models are evolved and selected using the genetic algorithm method based on the function value, so as to search the solution of at least the position information of the object out of the above input image data, therefore, binary processing for multi-grayscale input image data is unnecessary, amplification of noise due to binary processing can be avoided, and the position information and orientation information of the object can be accurately determined, to recognize the object, recognized regardless the change of luminance value of the object due to environmental changes. Also, the position information of the object included in the raw image can be obtained without executing threshold setting processing and geometric characteristic extracting processing, such as fine line processing, which are required for binary processing, so smooth image processing can be executed.

Also, by using a method of limiting the search range of the object included in the above input image data by assigning constraints to evolve the position and orientation information of the search models, a quick search focusing on a local area is possible, and it is possible to quickly recognize the object even for an application where real-time processing is required.

Also, by regarding the position and orientation information of a search model which has the highest function value at a desired control timing without waiting for convergence of evolution, the object can be searched at very high-speed, and a moving object in particular can be accurately recognized and traced.

What is claimed is:

1. An image recognition method comprising the steps of:

storing search models used for searching area, where all or a part of shape and luminance value distribution of an object are modeled in an area state, as image data in advance;

obtaining input image data including the object;

distributing the search models in the area of said input image data, and assigning the position and orientation information to each one of said search models as individual information;

determining a function value to indicate a correlation with said object for each one of said search models; and searching the solution of at least the position information of the object from said input image data by evolving said search models using a genetic algorithm based on said function values.

2. The image recognition method according to claim 1, wherein a plurality of search models are randomly distributed in the area of said input image data.

3. The image recognition method according to claim 1 or claim 2, wherein a sum of values determined from the luminance values of said input image data in the internal area of the search model is used for said function value.

4. The image recognition method according to claims 1 or 2, wherein constraints are assigned to the evolution of the position and orientation information of said search models so as to limit the search range of the object included in said input image data.

5. The image recognition method according to claims 1 or 2, wherein the position and orientation information of a search model having a highest function value at a desired control timing is regarded as an optimum solution without waiting for convergence of evolution.

* * * * *